(12) United States Patent
Lee et al.

(10) Patent No.: US 12,199,798 B2
(45) Date of Patent: Jan. 14, 2025

(54) TRANSMISSION/RECEPTION METHOD AND DEVICE FOR ISOLATED COMMUNICATION

(71) Applicants: SK ON CO., LTD., Seoul (KR); AUTOSILICON INC., Seoul (KR)

(72) Inventors: Jae Hee Lee, Daejeon (KR); Woo Jung Kim, Daejeon (KR); Ki Man La, Daejeon (KR); Sang Hae Park, Daejeon (KR); Jeong Min Seo, Daejeon (KR); Ki Bum Sung, Daejeon (KR); Ho Sang Jang, Daejeon (KR); Jong Kyoung Lee, Daejeon (KR); Jin Yong Jeon, Daejeon (KR)

(73) Assignees: SK ON CO., LTD., Seoul (KR); AUTOSILICON INC., Seoul (KR)

( * ) Notice: Subject to any disclaimer, the term of this patent is extended or adjusted under 35 U.S.C. 154(b) by 39 days.

(21) Appl. No.: 18/148,082

(22) Filed: Dec. 29, 2022

(65) Prior Publication Data
US 2023/0208684 A1 Jun. 29, 2023

(30) Foreign Application Priority Data
Dec. 29, 2021 (KR) .................. 10-2021-0191568

(51) Int. Cl.
*H04L 25/02* (2006.01)
(52) U.S. Cl.
CPC ...... *H04L 25/0284* (2013.01); *H04L 25/0268* (2013.01); *H04L 25/0296* (2013.01)

(58) Field of Classification Search
CPC . H04B 1/525; H04L 25/0268; H04L 25/0284; H04L 25/0296
See application file for complete search history.

(56) References Cited

U.S. PATENT DOCUMENTS 8,576,928 B2 * 11/2013 Allen .................. H04L 25/4917
375/257
8,594,175 B2 11/2013 Lee et al.
(Continued)

FOREIGN PATENT DOCUMENTS

CN 110489373 A 11/2019
KR 10-2012-0071951 A 7/2012
(Continued)

*Primary Examiner* — Dac V Ha
(74) *Attorney, Agent, or Firm* — Perkins Coie LLP

(57) ABSTRACT

A transmission/reception method and device for isolated communication is proposed. The transmission/reception method includes performing transmission, wherein bit streams are extracted from data and two or more predetermined number of bits are modulated into one DC balanced symbol so as to generate a signal in which a plurality of symbols are listed, thereby transmitting the signal through an isolated communication circuit, and performing reception, wherein the signal is received through the isolated communication circuit and the plurality of symbols included in the signal are demodulated into the two or more predetermined number of bits so as to generate the bit streams and organize the bit streams into the data. The transmission/reception method and device may reduce power consumption at the same communication speed because a plurality of bits is represented by the one DC balanced symbol.

11 Claims, 8 Drawing Sheets

(56) References Cited

U.S. PATENT DOCUMENTS

| | | | |
|---|---|---|---|
| 2015/0281743 A1* | 10/2015 | Yi | H03M 13/6312 |
| | | | 375/240.27 |
| 2020/0079275 A1* | 3/2020 | Kamath | H04L 25/0266 |
| 2021/0050734 A1* | 2/2021 | Huot-Marchand | |
| | | | H04L 25/4919 |

FOREIGN PATENT DOCUMENTS

| KR | 10-1176214 B1 | 8/2012 |
|---|---|---|
| KR | 10-2017-0137089 A | 12/2017 |

\* cited by examiner

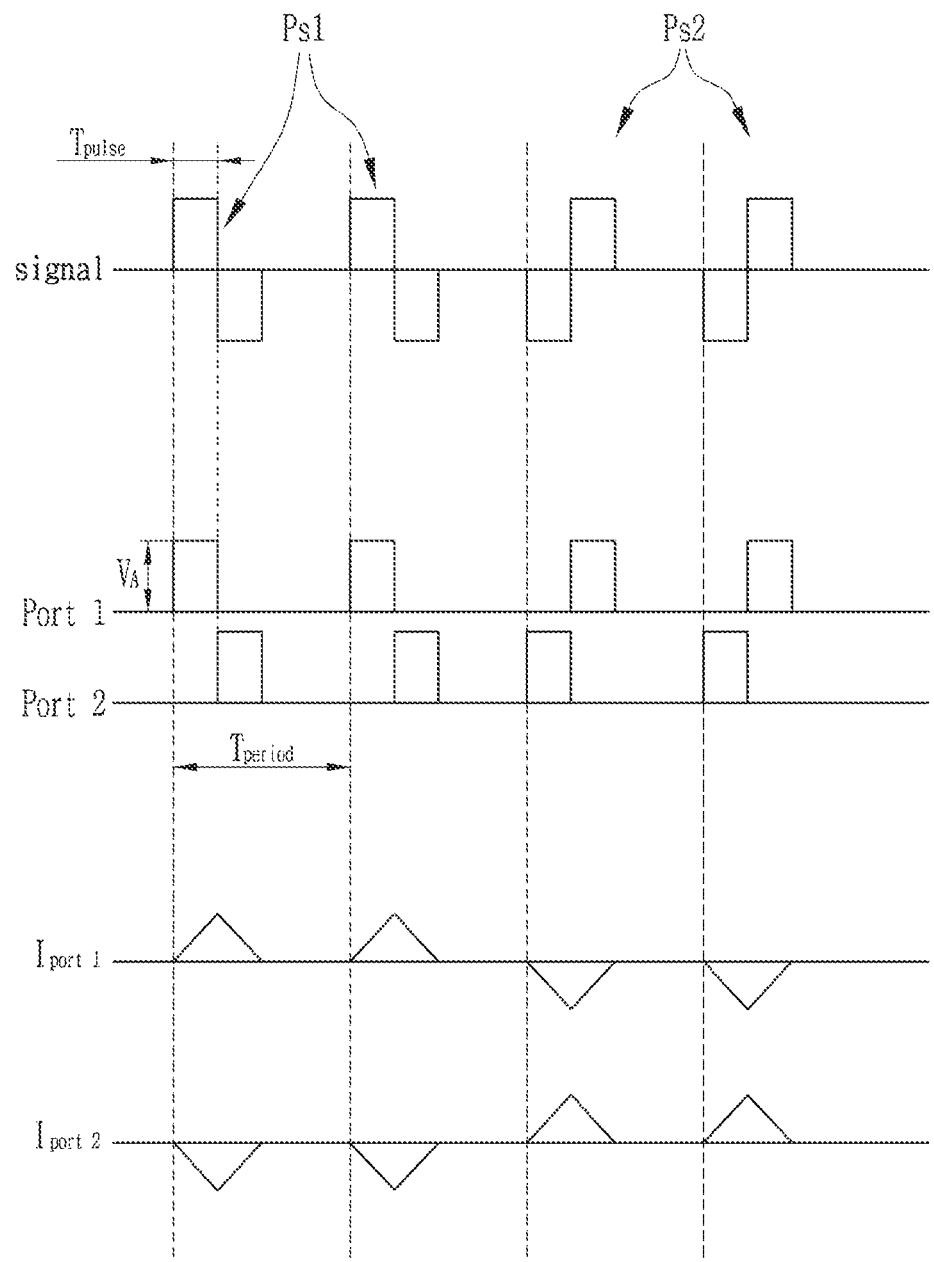

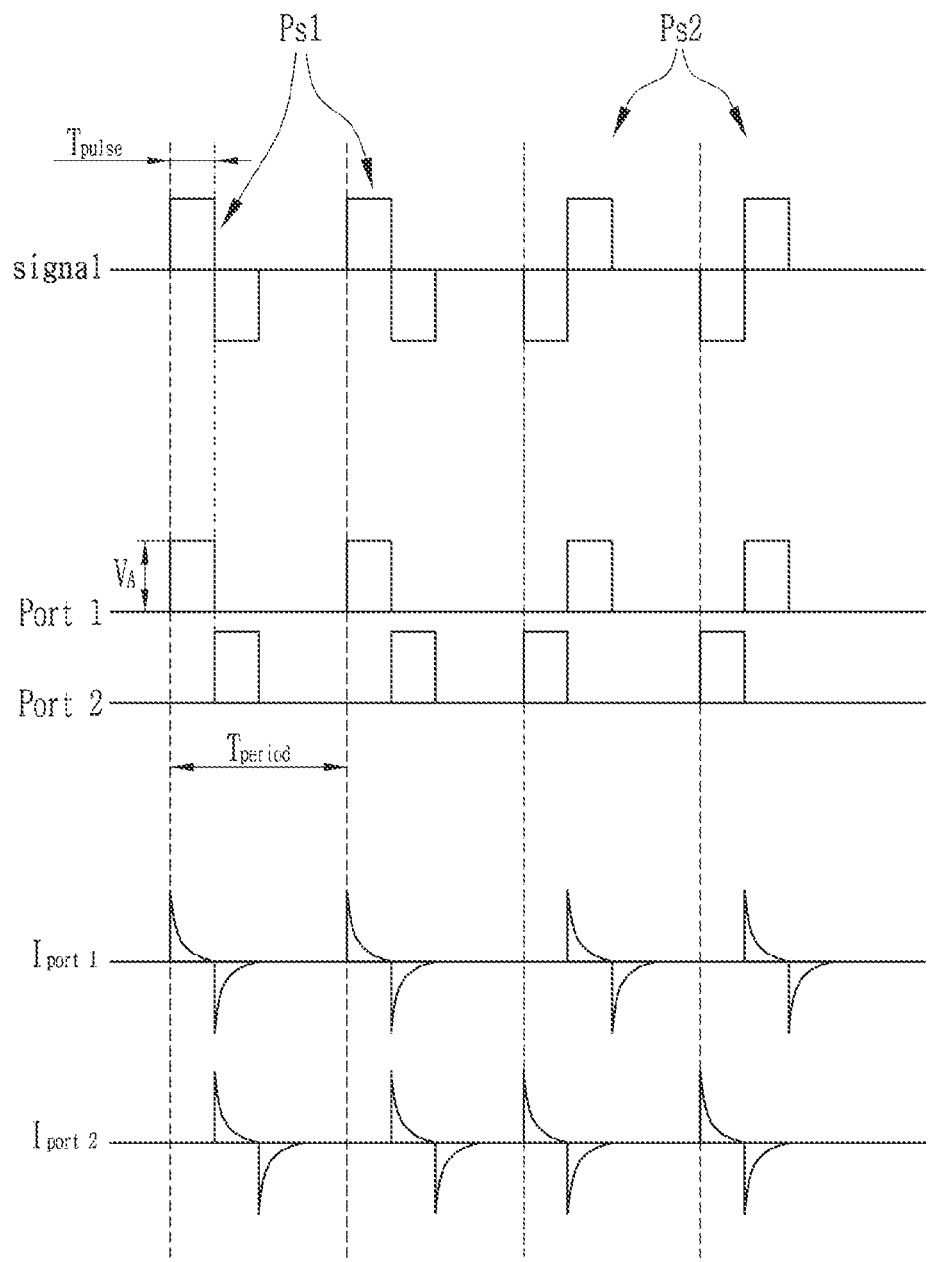

TRANSMISSION/RECEPTION METHOD AND DEVICE FOR ISOLATED COMMUNICATION

PRIORITY CLAIM AND CROSS REFERENCE TO RELATED APPLICATION

This patent document timely claims priority to Korean Patent Application No. 10-2021-0191568, filed Dec. 29, 2021, the entire contents of which is incorporated herein for all purposes by this reference.

TECHNICAL HELD

The disclosure of this patent document relates to a transmission/reception method and device for isolated communication between two circuits or circuit sections in an electrical system.

BACKGROUND

When a communication speed increases in a galvanic isolated communication between two circuits or circuit sections in an electrical system, the current consumption may increase which may place a limit to the level of the communication speed to be increased. Isolated communication has various performance indicators, including, e.g., galvanic isolation, DC balanced signaling, bi-direction, etc. Certain isolated communication methods that are previously published may not satisfy all the various performance indicators.

SUMMARY a transmission/reception method and device for isolated communication between two circuits or circuit sections in an electrical system Certain implementations of one or more exemplary embodiments of the technology disclosed in the present disclosure may be used to provide a transmission/reception method and device for isolated communication, wherein a plurality of bits is represented and transmitted as one DC balanced symbol.

A transmission/reception method for isolated communication according to one exemplary embodiment of the technology disclosed in the present disclosure may include: performing transmission, wherein bit streams are extracted from data and two or more predetermined number of bits are modulated into one DC balanced symbol so as to generate a signal in which a plurality of symbols are listed, thereby transmitting the signal through an isolated communication circuit; and performing reception, wherein the signal is received through the isolated communication circuit and the plurality of symbols included in the signal are demodulated into the two or more predetermined number of bits so as to generate the bit streams and organize the bit streams into the data.

In addition, in some implementations, the performing of the transmission may include: generating the bit streams, wherein the bit streams are extracted from the data; performing the modulation, wherein the two or more predetermined number of bits in the bit streams are modulated into the one DC balanced symbol to generate the signal in which the plurality of symbols are listed; and transmitting the signal, wherein the signal is transmitted through the isolated communication circuit.

In addition, in some implementations, the performing of the reception may include: receiving the signal, wherein the signal is received through the isolated communication circuit; performing the demodulation, wherein the plurality of symbols included in the signal are demodulated into the two or more predetermined number of bits to generate the bit streams; and generating the data, wherein the data is generated by arranging the bit streams.

A transmission/reception device for isolated communication according to another exemplary embodiment of the technology disclosed in the present disclosure may include: a transmission device configured to extract bit streams from data and modulate two or more predetermined number of bits into one DC balanced symbol so as to generate a signal in which a plurality of symbols are listed and transmit the signal through an isolated communication circuit; and a reception device configured to receive the signal through the isolated communication circuit and demodulate the plurality of symbols included in the signal into the two or more predetermined number of bits so as to generate the bit streams and organize the bit streams into the data.

In addition, in some implementations, the transmission device may include: a bit stream generation unit configured to extract the bit streams from the data; a modulation unit configured to modulate the two or more predetermined number of bits in the bit streams into the one DC balanced symbol to generate the signal in which the plurality of symbols are listed; and a transmission unit configured to transmit the signal through the isolated communication circuit.

In addition, in some implementations, the reception device may include: a reception unit configured to receive the signal through the isolated communication circuit; a demodulation unit configured to demodulate the plurality of symbols included in the signal into the two or more predetermined number of bits to generate the bit streams; and a data generation unit configured to generate the data by arranging the bit streams.

In addition, in some implementations, the isolated communication circuit may be a galvanic isolated communication circuit using a capacitor or a transformer.

In addition, in some implementations, each symbol may include a pulse whose period is shorter than a period of a clock.

In addition, in some implementations, each symbol may include a space having no pulse until a next symbol after the pulse.

In addition, in some implementations, each symbol may modulate two bits of the data by using two types of pulses, wherein each symbol may include two pulses of any one type among the two types of pulses when the two bits of the data are the same with each other and include one pulse of any one type among the two types of pulses when the two bits of the data are different from each other, or each symbol may include one pulse of any one type among the two types of pulses when the two bits of the data are the same with each other and include two pulses of any one type among the two types of pulses when the two bits of the data are different from each other.

In addition, in some implementations, the two types of pulses may be respectively a first type pulse and a second type pulse which are DC balanced, and a phase of the first type pulse and a phase of the second type pulse may be opposite to each other.

According to the exemplary embodiment of the present disclosure, since the plurality of bits is represented by one DC balanced symbol, the power consumption may be reduced at the same communication speed.

Various features and advantages of certain implementation of the technology disclosed in the present disclosure will become more apparent from the following detailed description taken in conjunction with the accompanying drawings.

BRIEF DESCRIPTION OF THE DRAWINGS

FIG. 3A is a view illustrating pulses and currents in the galvanic isolated communication circuit using the transformer of the transmission/reception device for the isolated communication in an electrical system according to the exemplary embodiment of the present disclosure.

FIG. 3B is a view illustrating pulses and currents in the galvanic isolated communication circuit using the capacitor of the transmission/reception device for the isolated communication in an electrical system according to the exemplary embodiment of the present disclosure.

DETAILED DESCRIPTION

Figure 1:
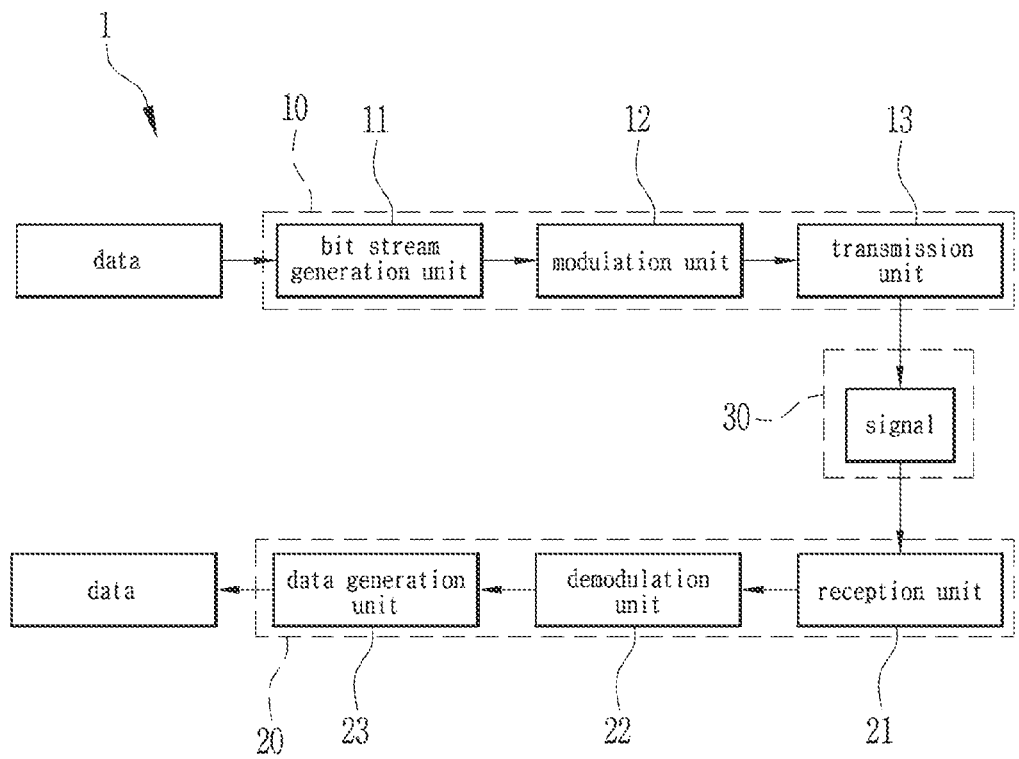
FIG. 1 is a view illustrating a transmission/reception device in an electrical system for isolated communication according to an exemplary embodiment of the present disclosure.

Certain advantages, and novel features of the exemplary embodiments of the present disclosure will become more apparent from the following detailed description and preferred exemplary embodiments described in conjunction with the accompanying drawings. In adding reference numerals to the components of each drawing, it should be noted that the same reference numerals are used to refer to the same components as much as possible even if displayed on different drawings. In addition, terms such as "one surface", "the other surface", "first", "second", etc. are used to distinguish one component from another component, and the components are not limited by the terms.

FIG. 1 is a view illustrating a transmission/reception device 1 in an electrical system for isolated communication in an electrical system according to the exemplary embodiment of the present disclosure.

The transmission/reception device 1 for isolated communication according to the exemplary embodiment of the present disclosure may include: a transmission device 10 configured to extract bit streams from data and modulate two or more predetermined number of bits into one DC balanced symbol so as to generate a signal in which a plurality of symbols are listed and transmit the signal through an isolated communication circuit; and a reception device 20 configured to receive the signal through an isolated communication circuit 30 and demodulate the plurality of symbols included in the signal into the two or more predetermined number of bits so as to generate the bit streams and organize the bit streams into the data.

The transmission device 10 may include: a bit stream generation unit 11 configured to extract the bit streams from the data; a modulation unit 12 configured to modulate the two or more predetermined number of bits in the bit streams into one DC balanced symbol to generate the signal in which the plurality of symbols are listed; and a transmission unit 13 configured to transmit the signal through the isolated communication circuit 30.

The bit stream generation unit 11 may extract bit streams from data and provide the bit streams to a modulation unit 12. The bit stream generation unit 11 may generate the bit streams corresponding to a portion of the data required to be transmitted. The modulation unit 12 may modulate a predetermined number of bits into one symbol. The modulation unit 12 may modulate two or more bits into one DC balanced symbol. The modulation unit 12 may generate a signal including a plurality of symbols by sequentially modulating the bit streams into the symbols. The signal including the plurality of symbols is transmitted to a transmission unit 13, and the transmission unit 13 transmits the signal through an isolated communication circuit 30 such as a galvanic isolated communication circuit.

The reception device 20 may include: a reception unit 21 configured to receive the signal through the isolated communication circuit 30; a demodulation unit 22 configured to demodulate the plurality of symbols included in the signal into the two or more predetermined number of bits to generate the bit streams; and a data generation unit 23 configured to generate the data by arranging the bit streams.

The reception unit 21 may receive the signal transmitted by the transmission unit 13 through the galvanic isolated communication circuit 30. The reception unit 21 transmits the signal to a demodulation unit 22. The demodulation unit 22 may generate bit streams by sequentially demodulating the plurality of symbols included in the signal. The demodulation unit 22 may obtain two or more bits from one DC balanced symbol. The demodulation unit 22 transmits the generated bit streams to a data generation unit 23. The data generation unit 23 may generate the data by arranging the bit streams. The data generation unit 23 may output the data.

The isolated communication circuit 30 be implemented in various ways to provide communications between the transmission unit 13 and the reception unit 21 by providing electrical isolation or separation between the transmission unit 13 and the reception unit 21. For example, in various implementations, the isolated communication circuit 30 may include the galvanic isolated communication circuit using a capacitor or a transformer. Such electrical isolation between different circuits or circuit sections of an electrical system can be important in various applications, including but not limited to, all electrical vehicles, hybrid vehicles and other systems that use high power batteries.

Figure 2A:
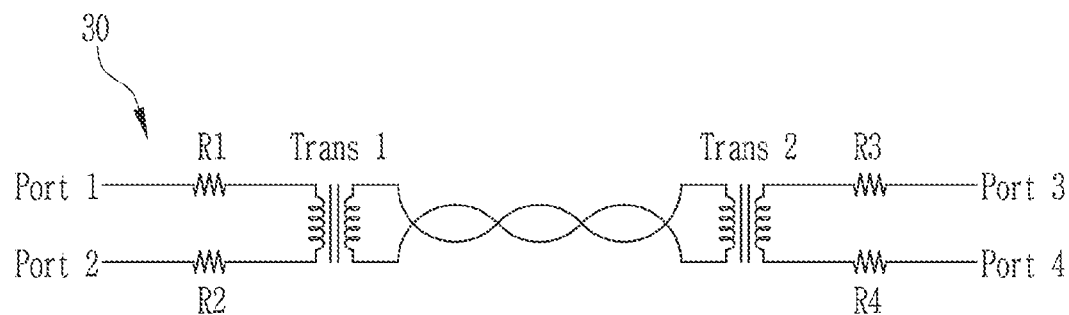
FIG. 2A is a view illustrating a galvanic isolated communication circuit using a transformer of the transmission/reception device for the isolated communication in an electrical system according to the exemplary embodiment of the present disclosure.
Figure 2B:
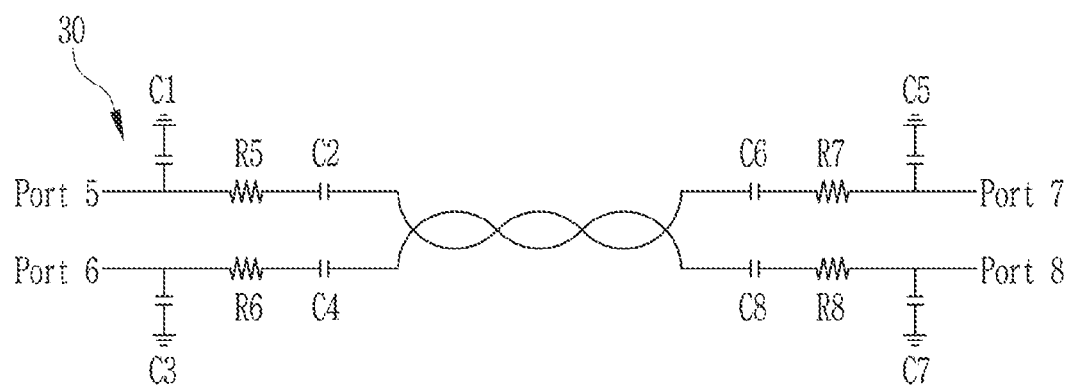
FIG. 2B is a view illustrating a galvanic isolated communication circuit using a capacitor of the transmission/reception device for the isolated communication in an electrical system according to the exemplary embodiment of the present disclosure.

FIG. 2A is a view illustrating an example of a galvanic isolated communication circuit for implementing isolated communication circuit 30 using a transformer of the transmission/reception device 1 for the isolated communication in an electrical system according to the exemplary embodiment of the present disclosure. FIG. 2B is a view illustrating a galvanic isolated communication circuit 30 using a capacitor of the transmission/reception device 1 for the isolated communication in an electrical system according to the exemplary embodiment of the present disclosure The galvanic isolated communication circuit 30 using the transformer shown in FIG. 2A may be used in the transmission/reception device 1 for the isolated communication according to the exemplary embodiment of the present disclosure. The galvanic isolated communication circuit 30 using the transformer may include a port 1 Port 1 and a port 2 Port 2 at a transmitting end, and a port 3 Port 3 and a port 4 Port 4 at a receiving end. A first resistor R1 may be connected to the port 1 Port 1, a primary side of a first transformer Trans 1 may be connected to the first resistor R1, a second resistor R2 may be connected to the primary side of the first transformer Trans 1, and the port 2 Port 2 may be connected to the second resistor R2. Similarly, a third resistor R3 may be connected to the port 3 Port 3, a secondary side of a second transformer Trans 2 may be connected to the third resistor R3, a fourth resistor R4 may be connected to the secondary side of the second transformer Trans 2, and the port 4 Part 4 may be connected to the fourth resistor R4. A secondary side of the first transformer Trans 1 and a primary side of the second transformer Trans 2 may be connected to each other by a twisted pair line (TPL).

The galvanic isolated communication circuit 30 using the capacitor shown in FIG. 2B may be used in the transmission/reception device 1 for the isolated communication according to the exemplary embodiment of the present disclosure. The galvanic isolated communication circuit 30 using the capacitor may include a port 5 Port 5 and a port 6 Port 6 at a transmitting end, and a port 7 Port 7 and a port 8 Port 8 at a receiving end. A fifth resistor R5 is connected to the port 5 Port 5, a first capacitor C1 is connected to a point where the port 5 Port 5 and the fifth resistor R5 are connected to each other, the first capacitor C1 is connected to a ground, a second capacitor C2 is connected to the fifth resistor R5, and the second capacitor C2 is connected to one end of a first line of a TPL. A sixth resistor R6 is connected to the port 6 Port 6, a third capacitor C3 is connected to a point where the port 6 Port 6 and the sixth resistor R6 are connected to each other, the third capacitor C3 is connected to the ground, a fourth capacitor C4 is connected to the sixth resistor R6, and the fourth capacitor C4 is connected to one end of a second line of the TPL. Similarly, a seventh resistor R7 is connected to the port 7 Port 7, a fifth capacitor C5 is connected to a point where the port 7 and the seventh resistor R7 are connected to each other, the fifth capacitor C5 is connected to the ground, a sixth capacitor C6 is connected to the seventh resistor R7, and the sixth capacitor C6 is connected to the other end of the first line of the TPL. An eighth resistor R8 is connected to the port 8 Port 8, a seventh capacitor C7 is connected to a point where the port 8 and the eighth resistor R8 are connected to each other, the seventh capacitor C7 is connected to the ground, an eighth capacitor C8 is connected to the eighth resistor R8, and the eighth capacitor C8 is connected to the other end of the second line of the TPL.

The galvanic isolated communication circuit 30 using the transformer or capacitor shown in FIGS. 2A and 2B may prevent current flow between the transmitting end and receiving end even when there is a voltage difference between the corresponding transmitting end and receiving end. An opto-coupler, a relay, and the like may be used in addition to the transformer or capacitor. However, the galvanic isolated communication circuit 30 using the transformer or capacitor is suitable in terms of price and speed. Through differential signaling, the galvanic isolated communication circuit 30 using the transformer or capacitor may perform robust communication against common mode noise. The communication using the differential signaling requires a DC balanced signal. When the signal is not the DC balanced signal, since a DC component is included in the signal, a signal level may be reduced or a reception offset may occur, thereby making the communication vulnerable to noise.

A transmission/reception method for isolated communication according to the exemplary embodiment of the present disclosure uses a DC balanced symbol representing a predetermined number of bits. Accordingly, a signal does not include a DC component, and there is no problem of being vulnerable to noise due to a decrease in signal level or occurrence of a reception offset.

The galvanic isolated communication circuit 30 using the transformer or capacitor shown in FIGS. 2A and 2B may use a communication method different from that of the exemplary embodiment of the present disclosure. For a comparative example, as methods for generating a DC balanced signal at a 4 Mbps level, there are Manchester coding, amplitude modulation, 8$b$/10$b$ coding, DC balanced symbol method, and the like. Manchester coding generates an edge in a center of data. The Manchester coding is simple in encoding and decoding thereof, but is usable only when a data rate is defined, and has a disadvantage in being sensitive to a clock frequency change. The amplitude modulation uses a method that transmits a clock and varies amplitudes according to data, and may extract the clock and data when a signal is decoded, but has a disadvantage in that a circuit thereof is complicated and susceptible to noise because the amplitudes should be varied. The 8$b$/10$b$ coding has a disadvantage in that a clock and data recovery (CDR) circuit is required, or when consecutive 0 s or 1 s are transmitted, signal transmission may not be possible due to filtering by galvanic isolation. The DC balanced symbol uses a method of defining a pair of positive and negative pulses as one bit and distinguishing 0 and 1 depending on whether the pulses occur in positive/negative order or negative/positive order, and there is a section in which data is transmitted at 0 (zero) V between data and data. Accordingly, DC balance for every bit may be maintained. However, in order to guarantee the section where the data is transmitted at 0V, a pulse time should be shorter than that of other methods and a bandwidth of a signal becomes wide, so a highest communication speed is limited compared to that of other methods. The DC balanced symbol has a somewhat limited communication speed, but is suitable for use in an isolated communication circuit because there are no other major drawbacks.

FIG. 3A is a view illustrating pulses and currents in the galvanic isolated communication circuit 30 using the transformer of the transmission/reception device 1 for the isolated communication in an electrical system according to the exemplary embodiment of the present disclosure. FIG. 3B is a view illustrating pulses and currents in the galvanic isolated communication circuit 30 using the capacitor of the transmission/reception device 1 for the isolated communication in an electrical system according to the exemplary embodiment of the present disclosure.

In galvanic isolated communication, current consumption characteristics vary depending on galvanic isolators. As shown in FIG. 3A, when a galvanic isolator is a transformer, the current consumption increases in proportion to durations and magnitudes of pulses. An exemplary signal includes a DC-balanced first type pulse Ps1 in a positive pulse/negative pulse sequence and a DC-balanced second type pulse Ps2 in a negative pulse/positive pulse sequence. In this case, when a positive pulse and negative pulse of a pulse are separately illustrated, a view may be illustrated such that the positive pulse is positive in the port 1 and the negative pulse is positive in the port 2.

A current Iport1 of the port 1 rises at a start point of a positive pulse of a first type pulse Ps1, is highest at an end point of the positive pulse (i.e., a start point of a negative pulse), and falls and becomes 0 (zero) at an end point of the negative pulse. The current Iport1 of the port 1 falls at a start point of a negative pulse of a second type pulse Ps2, is lowest at an end point of the negative pulse (i.e., a start point of a positive pulse), and rises and becomes 0 (zero) at an end point of the positive pulse.

A current Iport2 of the port 2 falls at a start point of a positive pulse of a first type pulse Ps1, is lowest at an end point of the positive pulse (i.e., a start point of a negative pulse), and rises and becomes 0 (zero) at an end point of the negative pulse. The current Iport2 of the port 2 rises at a start point of a negative pulse of a second type pulse Ps2, is highest at an end point of the negative pulse (i.e., a start point of a positive pulse), and falls and becomes 0 (zero) at an end point of the positive pulse.

In this case, the number of rising and falling waveforms of the current flowing through the transformer appears to be the same as the number of pulses.

As described above, the galvanic isolated communication circuit 30 using the transformer may maintain a current or voltage to zero in a pulse or symbol unit by using a DC balanced symbol. A value of the current flowing through the transformer may be obtained by Equation 1 below.

$$I_{Trans} = \frac{2 \times V_A \times T_{pulse}}{L_{Trans} \times T_{period}} \quad \text{[Equation 1]}$$

$I_{Trans}$: current flowing through transformer, $V_A$: amplitude of pulse, $T_{pulse}$: period of pulse, $L_{Trans}$: inductance of transformer, $T_{period}$: period of symbol.

As shown in FIG. 3B, when a galvanic isolator is a capacitor, current consumption increases in proportion to the number and magnitudes of pulses. An exemplary signal includes a first type pulse Ps1 and a second type pulse Ps2. In this case, when a positive pulse and negative pulse of a pulse are separately illustrated, a view may be illustrated such that the positive pulse is positive in the port 1 and the negative pulse is positive in the port 2.

In the current Iport1 of the port 1, a rising edge appears as a positive value proportional to the amplitude of the pulse at the start point of the positive pulse of the first type pulse Ps1 and exponentially decreases to zero, and a rising edge appears as a negative value proportional to the amplitude of the pulse at the end point of the positive pulse of the first type pulse Ps1 and exponentially decreases to zero. In the current Iport2 of the port 2, a rising edge appears as a positive value proportional to the amplitude of the pulse at the start point of the negative pulse of the first type pulse Ps1 and exponentially decreases to zero, and a rising edge appears as a negative value proportional to the amplitude of the pulse at the end point of the negative component of the first type pulse Ps1 and exponentially decreases to zero.

In the current Iport1 of the port 1, a rising edge appears as a positive value proportional to the amplitude of the pulse at the start point of the positive pulse of the second type pulse Ps2 and exponentially decreases to zero, and a rising edge appears as a negative value proportional to the amplitude of the pulse at the end point of the positive pulse of the second type pulse Ps2 and exponentially decreases to zero. In the current Iport2 of the port 2, a rising edge appears as a positive value proportional to the amplitude of the pulse at the start point of the negative pulse of the second type pulse Ps2 and exponentially decreases to zero, and a rising edge appears as a negative value proportional to the amplitude of the pulse at the end point of the negative component of the second type pulse Ps2 and exponentially decreases to zero.

In this case, the number of rising edges is proportional to the number of positive or negative components of the pulses. That is, the number of rising edges is proportional to the number of pulses.

As described above, the galvanic isolated communication circuit 30 using the capacitor may maintain the current or voltage to zero in the pulse or symbol unit by using the DC balanced symbol. A value of the current flowing through the capacitor may be obtained by Equation 2 below.

$$I_{Cap} = \frac{2 \times V_A \times C_p \times N}{T_{period}} \quad \text{[Equation 2]}$$

$I_{Cap}$: current flowing through capacitor, $V_A$: amplitude of pulse, $C_p$: capacitance of capacitor, N: sum of the number of rising edges in one symbol, $T_{period}$: period of symbol.

Figure 4:
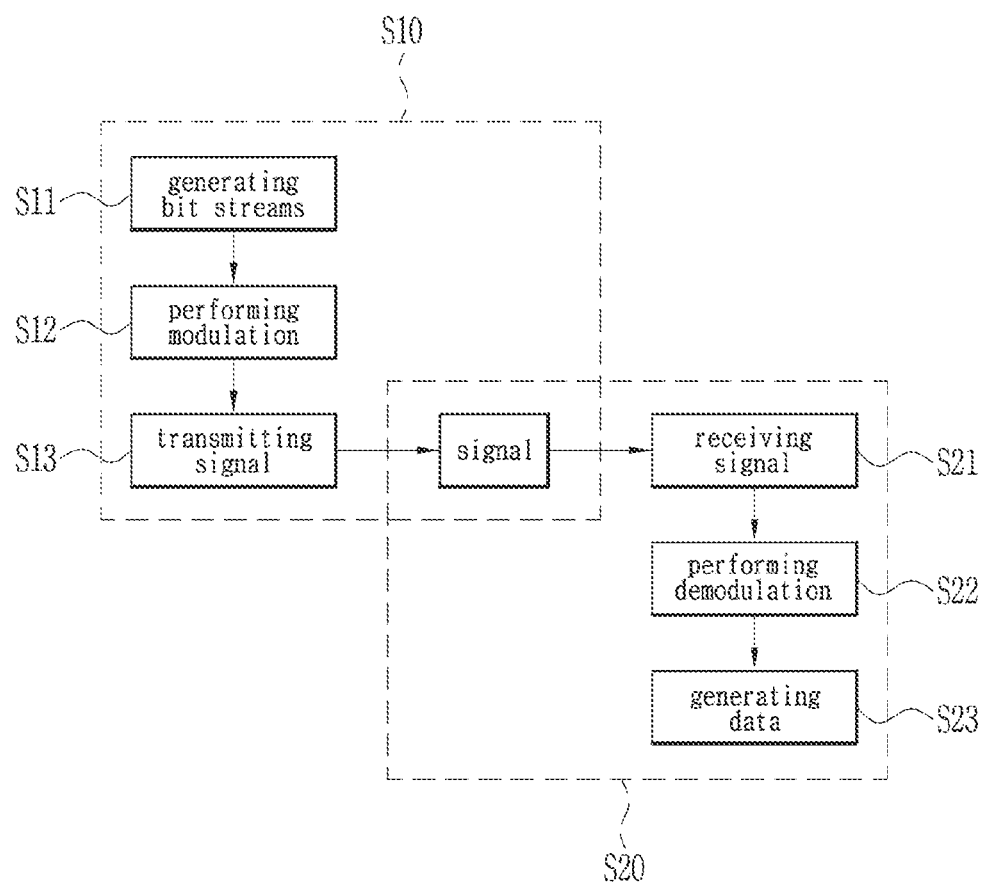
FIG. 4 is a view illustrating a transmission/reception method for isolated communication in an electrical system according to the exemplary embodiment of the present disclosure.

FIG. 4 is a view illustrating a transmission method for isolated communication and a reception method for isolated communication in an electrical system according to the exemplary embodiment of the present disclosure.

As shown in FIG. 4, a transmission/reception method for isolated communication according to the exemplary embodiment of the present disclosure may include: step S10 of performing transmission, wherein bit streams are extracted from data and two or more predetermined number of bits are modulated into one DC balanced symbol so as to generate a signal in which a plurality of symbols are listed, thereby transmitting the signal through an isolated communication circuit; and step S20 of performing reception, wherein the signal is received through the isolated communication circuit and the plurality of symbols included in the signal are demodulated into the two or more predetermined number of bits so as to generate the bit streams and organize the bit streams into the data.

The performing of the transmission may include: step S11 of generating the bit streams, wherein the bit streams are extracted from the data; step S12 of performing the modulation, wherein the two or more predetermined number of bits in the bit streams are modulated into the one DC balanced symbol to generate the signal in which the plurality of symbols are listed; and step S13 transmitting the signal, wherein the signal is transmitted through the isolated communication circuit.

Step S11 of generating the bit streams may be performed by a bit stream generation unit 11. Step S11 of generating the bit streams is a process of extracting the bit streams from data. Step S12 of performing the modulation may be performed by a modulation unit 12. Step S12 of performing the modulation is a process of generating a signal by modulating the bits into symbols. In step S12 of performing the modulation, two or more predetermined number of bits in the bit streams is modulated into symbols to generate a signal including a plurality of symbols in order. Step S13 of transmitting the signal may be performed by a transmission unit 13. Step S13 of transmitting the signal is a process of transmitting the generated signal by using an isolated communication circuit.

The performing of the reception may include: step S21 of receiving the signal, wherein the signal is received through the isolated communication circuit; step S22 of performing demodulation, wherein the plurality of symbols included in the signal are demodulated into the two or more predetermined number of bits to generate the bit streams; and step S23 of generating the data, wherein the data is generated by arranging the bit streams.

Step S21 of receiving the signal may be performed by a reception unit 21. Step S21 of receiving the signal is a process of receiving the signal including the plurality of symbols. The signal may be received through a galvanic isolation circuit. Step S22 of performing the demodulation may be performed by a demodulation unit 22. Step S22 of performing the demodulation is a process of generating the bit streams by demodulating each symbol included in the received signal. In Step S22 of performing the demodulation, the bit streams may be generated by demodulating each symbol included in the signal and generating two or more predetermined number of bits. Step S23 of generating the data may be performed by a data generation unit 23. Step S23 of generating the data is a process of generating the data by arranging the bit streams.

Hereinafter, the symbols used in the transmission/reception method and device for the isolated communication according to the exemplary embodiment of the present disclosure will be described.

Figure 5:
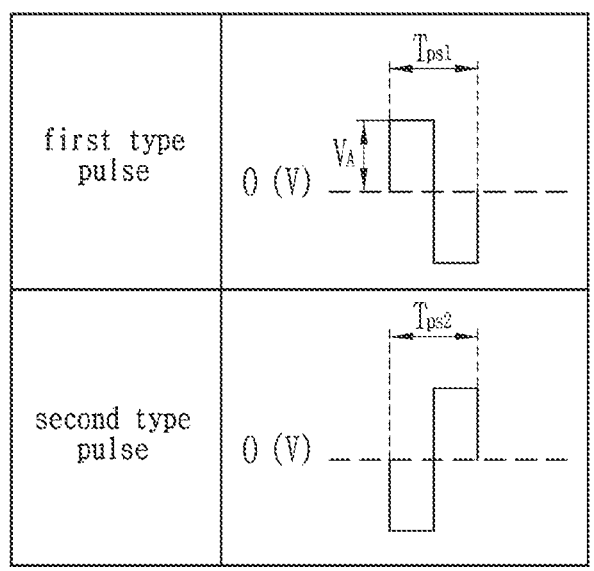
FIG. 5 is a view illustrating pulse shapes used in the transmission/reception method for the isolated communication according to the exemplary embodiment of the present disclosure.

FIG. 5 is a view illustrating pulse shapes used in the transmission/reception method for the isolated communication in an electrical system according to the exemplary embodiment of the present disclosure.

A pulse used in the transmission/reception method for the isolated communication according to the exemplary embodiment of the present disclosure is a DC balanced pulse. Areas of a positive pulse and a negative pulse are the same with respect to a dotted line indicating 0 V. The pulse may include a first type pulse Ps1 and a second type pulse Ps2. The first type pulse Ps1 is formed in an order of a positive pulse and a negative pulse. The second type pulse Ps2 is formed in an order of a negative pulse and a positive pulse. That is, a phase of the first type pulse is opposite to that of the second type pulse. A period of the first type pulse Ps1 is TPs1. A period of the second type pulse Ps2 is TPs2.

Although each of the first type pulse and the second type pulse is shown in a form of a square wave in FIG. 5, the first and second type pulses may be modified in various forms. In the present specification, the amplitude VA of the first type pulse and the second type pulse may be the same.

Figure 6:
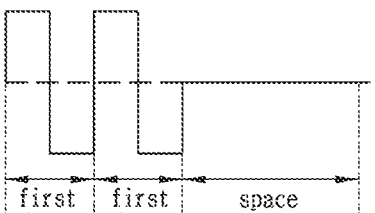
FIG. 6 is a view illustrating symbols used in the transmission/reception method for the isolated communication in an electrical system according to the exemplary embodiment of the present disclosure.

FIG. 6 is a view illustrating the symbols used in the transmission/reception method for the isolated communication in an electrical system according to the exemplary embodiment of the present disclosure.

A symbol is a smallest information unit for modulation or demodulation. The symbol may include data having a predetermined number of bits. FIG. 6 is a view illustrating each symbol representing two bits. When the symbol includes two bits of information, the information of which the symbol may represent has four types, including "11", "10", "01", and "00".

A period Tperiod of a symbol may be equal to a period of a clock having the same number as the number of bits represented by the symbol. For example, the period of the symbol including 2-bit data may be the same as the period of two clocks. The period of one clock is represented by TC.

The symbol may include a pulse having a shorter period TPulse than a period TC of a clock. In other words, the period TC of one clock is longer than the period TPulse of one pulse included in the symbol. As shown in FIG. 6, when data is "11", a period TPulse of the first type pulse is short when the period TPulse of the first type pulse is compared with the period TC of one clock. For example, a half of the period TC/2 of the clock and the period TPulse of the pulse may be the same. Alternatively, the period TPulse of the pulse may be ⅔ of the period TC of the clock. A difference in length between the period TPulse of the pulse and the period TC of the clock may be variously set.

A symbol may include a DC balanced pulse. Since the pulses included in the symbol are DC-balanced, the symbol is DC-balanced over the entire period TS of the symbol.

Each symbol may include a space having no pulse until a next symbol after the pulse. The symbol may include the pulses and space. The space is an area in which no pulse exist within a symbol interval. The space is a state in which a voltage or a current is zero. The symbol has the pulses placed first, followed by a space. Alternatively, the symbol may have the space placed first, and have the pulses placed thereafter. The space of the symbol prevents the pulses of adjacent symbols from appearing in succession.

The exemplary embodiment of modulating 2-bit data into a symbol will be described with reference to FIG. 6.

In a symbol, 2-bit data may be modulated by using two types of pulses.

A symbol may include two pulses having any one type among the two types of pulses when two bits of data are the same with each other and include one pulse having any one type among the two types of pulses when the two bits of the data are different from each other. In this case, the two types of pulses are the first type pulse and second type pulse which are DC-balanced, and the phases of the first type pulse and the second type pulse may be opposite to each other.

In FIG. 6, symbol 1 of which the data "11" is modulated has two first type pulses placed in succession, followed by a space. Symbol 2 of which the data "10" is modulated has one first type pulse placed first, followed by a space. Symbol 3 of which the data "01" is modulated has one second type pulse placed first, followed by a space. Symbol 4 of which the data "00" is modulated has two second type pulses placed in succession, followed by a space.

In the symbols shown in FIG. 6, symbols including the first type pulse and second type pulse in a reverse order may be formed. For example, symbol 1 of which the data "11" is modulated has two second type pulses placed in succession, followed by a space. Symbol 2 of which the data "10" is modulated has one second type pulse placed first, followed by a space. Symbol 3 of which the data "01" is modulated has one first type pulse placed first, followed by a space. Symbol 4 of which the data "00" is modulated has two first type pulses placed in succession, followed by a space.

The space of symbol 2 is longer than the space of symbol 1 by a length of the period TPulse of the pulse, and the space of symbol 3 is longer than the space of symbol 4 by the length of the period TPulse of the pulse. The first type pulse and the second type pulse are DC balanced pulses. The period of the first type pulse and the period of the second type pulse may be shorter than the period of one clock.

Alternatively, a symbol may include one pulse of any one type among the two types of pulses when two bits of data are the same with each other and include two pulses of any one type among the two types of pulses when two bits of data are different from each other.

In the symbols shown in FIG. 6, when the same data is provided, a symbol including fewer pulses may be formed. For example, symbol 1 of which the data "11" is modulated may have one first type pulse placed first, followed by a space. Symbol 2 of which the data "10" is modulated may have two first type pulses placed in succession, followed by a space. Symbol 3 of which the data "01" is modulated may have two second type pulses placed in succession, followed by a space. Symbol 4 of which the data "00" is modulated may have one second type pulse placed first, followed by a space.

In the symbols shown in FIG. 6, when the same data is provided, a symbol including fewer pulses and including the first type pulse and second type pulse in the inverse order may be formed. For example, symbol 1 of which the data "11" is modulated may have one second type pulse placed first, followed by a space. Symbol 2 of which the data "10" is modulated may have two second type pulses placed in succession, followed by a space. Symbol 3 of which the data "01" is modulated may have two first type pulses placed in succession, followed by a space. Symbol 4 of which the data "00" is modulated may have one first type pulse placed first, followed by a space.

The space of symbol 1 is longer than the space of symbol 2 by a length of the period TPulse of the pulse, and the space of symbol 4 is longer than the space of symbol 3 by the length of the period TPulse of the pulse. The first type pulse and the second type pulse are DC balanced pulses. The period of the first type pulse and the period of the second type pulse may be shorter than the period of one clock.

As described above, in the process of modulating 2-bit data into symbols, when the same data is provided, a greater or lesser number of pulses may be included, and a type of pulse representing bit 1 may be set as the first type pulse or the second type pulse.

The symbols according to the exemplary embodiment of the present disclosure use a mixture of a pulse number modulation method, a pulse phase modulation method, and the DC balanced symbol method.

Figure 7:
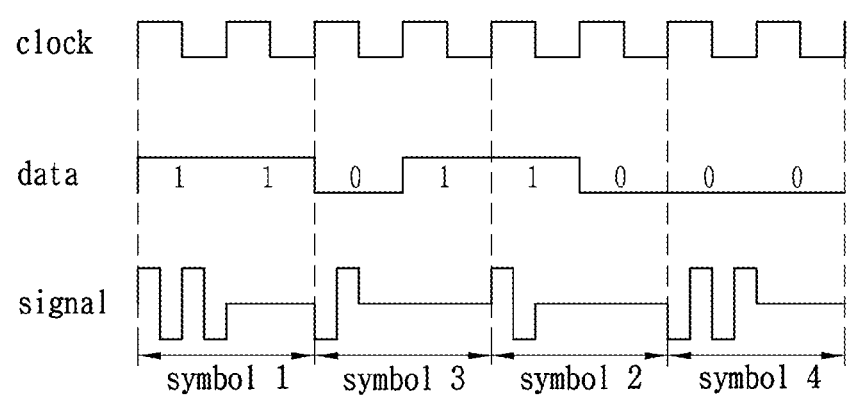
FIG. 7 is a view illustrating a signal used in the transmission/reception method for the isolated communication in an electrical system according to the exemplary embodiment of the present disclosure.

FIG. 7 is a view illustrating a signal used in the transmission/reception method for the communication in an electrical system according to the exemplary embodiment of the present disclosure. FIG. 7 is a view illustrating a signal generated by modulating a data bit stream "11011000" by using symbols according to the exemplary embodiment of the present disclosure.

According to the exemplary embodiment of the present disclosure, when 8-bit data is modulated for eight clocks, a signal including four symbols may be generated. One symbol represents two bits, and a period of one symbol is equal to a period of two clocks. Since one symbol represents two bits, when two bits are grouped in pair, data is "11", "01", "10", and "00". When the data is sequentially modulated with reference to FIG. 6, "symbol 1", "symbol 3", "symbol 2", and "symbol 4" are obtained. The signal may include "symbol 1", "symbol 3", "symbol 2", and "symbol 4" in an order of the data.

Data demodulation may be performed in a reverse order of the described process. In a case where the received signal includes "symbol 1", "symbol 3", "symbol 2", and "symbol 4" in order, when the symbols are demodulated in order with reference to FIG. 6, the data is "11", "01", "10", and "00". Accordingly, the data bit stream is "11011000".

Refer back to FIG. 6. According to the exemplary embodiment of the present disclosure, when each symbol representing two bits is used, current consumption may be reduced at the same transmission rate.

According to the exemplary embodiment of the present disclosure, symbol 1 representing data "11" includes two first type pulses, symbol 2 representing data "10" includes one first type pulse, symbol 3 representing data "01" includes one second type pulse, and symbol 4 representing data "00" includes two second type pulses. The number of pulses included in symbols 1 to 4 is six.

As a comparative example, there is a method of transmitting one DC balanced pulse for one clock every time one bit is transmitted. In the comparative example, "11" transmits two first type pulses, "10" transmits one first type pulse and one second type pulse, "01" transmits one second type pulse and one first type pulse, and "00" transmits two second type pulses. That is, in the comparative example, eight pulses are transmitted.

That is, in the symbols according to the exemplary embodiment of the present disclosure, the same data may be transmitted while transmitting 25% less pulses. When it is assumed that 1 and 0 exist each in half in random data as a whole, pulses of 25% may be reduced according to the exemplary embodiment of the present disclosure, The above disclosed exemplary embodiments of the present disclosure may be advantageously implemented in ways to improve the communication speed. In each symbol of the exemplary circuits or electrical systems disclosed in the present disclosure, a space is present by a predetermined length after pulses are present. The length of the space may vary depending on system specifications, but may be set to a specific length. The symbol according to the exemplary embodiment of the present disclosure needs to include just one space having a specific length after two pulses are included.

As the comparative example, there is the method of transmitting one DC balanced pulse for one clock every time one bit is transmitted. In the comparative example, since one DC balanced pulse and a space should be included in one clock, a signal transmitting two DC balanced pulses should include two spaces.

In contrast, in the exemplary embodiment of the present disclosure, since only one space is required to be included in a symbol including two pulses, one space may be included in a signal transmitting two bits. Therefore, the time consumed to transmit the space in the signal may be reduced. In addition, the communication speed may be improved by increasing the clock frequency by the amount of time obtained by reducing the number of spaces.

As described above, the technology of the present disclosure has been described through specific implementations of exemplary embodiments. Variations or enhancements to the disclosed embodiments and other embodiments may be made based on what is disclosed and/or illustrated in this patent document.

What is claimed is:

1. A transmission/reception method for isolated communication, the method comprising:
    performing transmission, wherein bit streams are extracted from data and two or more predetermined number of bits are modulated into one DC balanced symbol so as to generate a signal in which a plurality of symbols are listed, thereby transmitting the signal through an isolated communication circuit; and
    performing reception, wherein the signal is received through the isolated communication circuit and the plurality of symbols included in the signal are demodulated into the two or more predetermined number of bits so as to generate the bit streams and organize the bit streams into the data, wherein each symbol comprises:

a pulse; and a space having no pulse until a next symbol after the pulse.

2. The method of claim 1, wherein the performing of the transmission comprises:

generating the bit streams, wherein the bit streams are extracted from the data;

performing the modulation, wherein the two or more predetermined number of bits in the bit streams are modulated into the one DC balanced symbol to generate the signal in which the plurality of symbols are listed; and transmitting the signal, wherein the signal is transmitted through the isolated communication circuit, and wherein the performing of the reception comprises:

receiving the signal, wherein the signal is received through the isolated communication circuit;

performing the demodulation, wherein the plurality of symbols included in the signal are demodulated into the two or more predetermined number of bits to generate the bit streams; and generating the data, wherein the data is generated by arranging the bit streams.

3. A transmission/reception method for isolated communication, the method comprising:

performing transmission, wherein bit streams are extracted from data and two or more predetermined number of bits are modulated into one DC balanced symbol so as to generate a signal in which a plurality of symbols are listed, thereby transmitting the signal through an isolated communication circuit; and performing reception, wherein the signal is received through the isolated communication circuit and the plurality of symbols included in the signal are demodulated into the two or more predetermined number of bits so as to generate the bit streams and organize the bit streams into the data, wherein each symbol comprises a pulse whose period is shorter than a period of a clock.

4. A transmission/reception method for isolated communication, the method comprising:

performing transmission, wherein bit streams are extracted from data and two or more predetermined number of bits are modulated into one DC balanced symbol so as to generate a signal in which a plurality of symbols are listed, thereby transmitting the signal through an isolated communication circuit; and performing reception, wherein the signal is received through the isolated communication circuit and the plurality of symbols included in the signal are demodulated into the two or more predetermined number of bits so as to generate the bit streams and organize the bit streams into the data, wherein each symbol modulates two bits of the data by using two types of pulses, wherein each symbol comprises two pulses of any one type among the two types of pulses when the two bits of the data are the same as each other and comprises one pulse of any one type among the two types of pulses when the two bits of the data are different from each other, or each symbol comprises one pulse of any one type among the two types of pulses when the two bits of the data are the same as each other and comprises two pulses of any one type among the two types of pulses when the two bits of the data are different from each other.

5. The method of claim 4, wherein the two types of pulses are respectively a first type pulse and a second type pulse which are DC balanced, and a phase of the first type pulse and a phase of the second type pulse are opposite to each other.

6. A transmission/reception device for isolated communication, the device comprising:

a transmission device configured to extract bit streams from data and modulate two or more predetermined number of bits into one DC balanced symbol so as to generate a signal in which a plurality of symbols are listed and transmit the signal through an isolated communication circuit; and a reception device configured to receive the signal through the isolated communication circuit and demodulate the plurality of symbols included in the signal into the two or more predetermined number of bits so as to generate the bit streams and organize the bit streams into the data, wherein each symbol comprises:

a pulse; and a space having no pulse until a next symbol after the pulse.

7. The device of claim 6, wherein the isolated communication circuit is a galvanic isolated communication circuit using a capacitor or a transformer.

8. The device of claim 6, wherein the transmission device comprises:

a bit stream generation unit configured to extract the bit streams from the data;

a modulation unit configured to modulate the two or more predetermined number of bits in the bit streams into the one DC balanced symbol to generate the signal in which the plurality of symbols are listed; and a transmission unit configured to transmit the signal through the isolated communication circuit, and wherein the reception device comprises:

a reception unit configured to receive the signal through the isolated communication circuit;

a demodulation unit configured to demodulate the plurality of symbols included in the signal into the two or more predetermined number of bits to generate the bit streams; and a data generation unit configured to generate the data by arranging the bit streams.

9. A transmission/reception device for isolated communication, the device comprising:

a transmission device configured to extract bit streams from data and modulate two or more predetermined number of bits into one DC balanced symbol so as to generate a signal in which a plurality of symbols are listed and transmit the signal through an isolated communication circuit; and a reception device configured to receive the signal through the isolated communication circuit and demodulate the plurality of symbols included in the signal into the two or more predetermined number of bits so as to generate the bit streams and organize the bit streams into the data, wherein each symbol comprises a pulse whose period is shorter than a period of a clock.

10. A transmission/reception device for isolated communication, the device comprising:

a transmission device configured to extract bit streams from data and modulate two or more predetermined number of bits into one DC balanced symbol so as to generate a signal in which a plurality of symbols are listed and transmit the signal through an isolated communication circuit; and a reception device configured to receive the signal through the isolated communication circuit and demodulate the plurality of symbols included in the signal into the two or more predetermined number of bits so as to generate the bit streams and organize the bit streams into the data, wherein each symbol modulates two bits of the data by using two types of pulses, wherein each symbol comprises two pulses of any one type among the two types of pulses when the two bits of the data are the same as each other and comprises one pulse of any one type among the two types of pulses when the two bits of the data are different from each other, or each symbol comprises one pulse of any one type among the two types of pulses when the two bits of the data are the same as each other and comprises two pulses of any one type among the two types of pulses when the two bits of the data are different from each other.

11. The device of claim 10, wherein the two types of pulses are respectively a first type pulse and a second type pulse which are DC balanced, and a phase of the first type pulse and a phase of the second type pulse are opposite to each other.

* * * * *